United States Patent
Wong et al.

(10) Patent No.: US 7,748,616 B2
(45) Date of Patent: Jul. 6, 2010

(54) METHOD FOR IMPLEMENTING ANONYMOUS CREDIT CARD TRANSACTIONS USING A FICTITIOUS ACCOUNT NAME

(76) Inventors: Jacob Y. Wong, 7110 Georgetown Rd., Goleta, CA (US) 93117; Roy L. Anderson, 1433 Dwight Dr., Glendale, CA (US) 91207

( * ) Notice: Subject to any disclaimer, the term of this patent is extended or adjusted under 35 U.S.C. 154(b) by 1506 days.

(21) Appl. No.: 10/968,398

(22) Filed: Oct. 18, 2004

(65) Prior Publication Data

US 2005/0086160 A1    Apr. 21, 2005

Related U.S. Application Data

(63) Continuation of application No. 09/960,714, filed on Sep. 21, 2001, now Pat. No. 6,805,288, which is a continuation-in-part of application No. 09/667,081, filed on Sep. 21, 2000, now abandoned, and a continuation-in-part of application No. 09/667,089, filed on Sep. 21, 2000, now abandoned, which is a continuation-in-part of application No. 09/659,434, filed on Sep. 8, 2000, now abandoned, which is a continuation-in-part of application No. 09/640,044, filed on Aug. 15, 2000, now abandoned, which is a continuation-in-part of application No. 09/619,859, filed on Jul. 20, 2000, now abandoned, which is a continuation-in-part of application No. 09/571,707, filed on May 15, 2000, now Pat. No. 6,592,044.

(51) Int. Cl.
*G06K 5/00* (2006.01)
*G06Q 20/00* (2006.01)

(52) U.S. Cl. .................. 235/380; 340/5.81; 705/18; 705/41

(58) Field of Classification Search .................. 705/39, 705/18, 26, 41, 44; 235/375, 380, 382, 382.5; 340/5.8, 5.81
See application file for complete search history.

(56) References Cited

U.S. PATENT DOCUMENTS

| | | | | |
|---|---|---|---|---|
| 4,808,802 | A * | 2/1989 | Kano | 235/380 |
| 5,012,077 | A * | 4/1991 | Takano | 235/380 |
| 5,302,811 | A * | 4/1994 | Fukatsu | 235/380 |
| 5,426,281 | A * | 6/1995 | Abecassis | 235/380 |
| 5,444,616 | A * | 8/1995 | Nair et al. | 705/17 |
| 6,457,640 | B2 * | 10/2002 | Ramachandran et al. | 235/379 |
| 6,609,654 | B1 * | 8/2003 | Anderson et al. | 235/379 |
| 6,755,341 | B1 * | 6/2004 | Wong et al. | 235/380 |
| 6,938,022 | B1 * | 8/2005 | Singhal | 705/74 |
| 6,990,586 | B1 * | 1/2006 | Tresser et al. | 713/182 |
| 7,013,290 | B2 * | 3/2006 | Ananian | 705/27 |
| 7,069,249 | B2 * | 6/2006 | Stolfo et al. | 705/74 |
| 7,181,017 | B1 * | 2/2007 | Nagel et al. | 380/282 |
| 7,213,748 | B2 * | 5/2007 | Tsuei et al. | 235/380 |
| 7,264,152 | B2 * | 9/2007 | Tsuei et al. | 235/380 |
| 7,454,356 | B2 * | 11/2008 | Fields et al. | 705/1 |

* cited by examiner

*Primary Examiner*—Andrew Joseph Rudy
(74) *Attorney, Agent, or Firm*—Wagner, Anderson & Bright, LLP; Roy L Anderson

(57) ABSTRACT

A method for implementing an anonymous face to face or Mail Order Telephone Order credit card transaction by a user who has established a user account associated with a fictitious name. The user generates a valid personal charge number by executing an algorithm in a computer affixed to the electronic credit card that uses a user key and a card number as input variables. A merchant is provided with the valid personal charge number and the fictitious name that is submitted for approval to a credit approval center. The electronic credit card is sized such that a standard magnetic stripe reader can read it.

10 Claims, 1 Drawing Sheet

METHOD FOR IMPLEMENTING ANONYMOUS CREDIT CARD TRANSACTIONS USING A FICTITIOUS ACCOUNT NAME

CROSS REFERENCE TO RELATED APPLICATIONS

The present application is a continuation application of U.S. patent application Ser. No. 09/960,714, filed Sep. 21, 2001, now U.S. Pat. No. 6,805,288 which was a continuation-in-part application of U.S. application Ser. Nos. 09/667,081 and 09/667,089, filed Sep. 21, 2000, both now abandoned which are continuation-in-part applications of U.S. Ser. No. 09/659,434, filed Sep. 8, 2000, now abandoned which is a continuation-in-part of U.S. Ser. No. 09/640,044, filed Aug. 15, 2000, now abandoned which is a continuation-in-part of U.S. Ser. No. 09/619,859, filed Jul. 20, 2000, now abandoned which is a continuation-in-part of U.S. patent application Ser. No. 09/571,707, filed May 15, 2000, now U.S. Pat. No. 6,592,044. The present application continues the subject matter previously set forth in U.S. Ser. No. 09/619,859.

FIELD OF THE INVENTION

The present invention is in the field of credit cards and other cards, such as banking cards, which contain information in a magnetic stripe.

BACKGROUND OF THE INVENTION

Credit cards have been used for decades. A credit card typically has a 16-digit number (credit card number), a 4-digit number (expiration date), and a cardholder's name and business affiliation (if any) embossed on the front side of the card. The logo of the credit association or acquiring bank, or both, is also printed on the front side. On its back side is a magnetic stripe wherein all the pertinent personal information of the cardholder, such as primary account number, name, expiration date and encrypted Personal Identification Number (PIN) are encoded. The information contained in the magnetic stripe is not visible or readable directly from the card except with the use of special decoding equipment, such as a magnetic stripe reader. Also appearing on the backside is a space for accommodating the cardholder's personal signature and more printed information about the credit card issuer and/or Automatic Teller Machine (ATM) locations.

Prior to the ever-increasing use of online credit card purchases of goods and services on the Internet over the past several years, there were only two common forms of credit card transactions used by the general public. According to the parlance of the credit card industry, the first form of transaction is dubbed "face-to-face." A face-to-face transaction is one when the merchant establishes visual contact with the cardholder and the credit card and is therefore able to check the signature, verifying expiration date, etc. during a transaction. The second form of transaction is dubbed "MOTO" which stands for "Mail Order Telephone Order". A MOTO transaction is one when the consumer uses mail, phone or facsimile to order goods or services and the merchant does not have direct visual contact with the credit card or the credit card holder.

Unauthorized or fraudulent use of credit card purchases for goods and services has been with the industry ever since its inception. Although consumers generally face little financial risk because federal law caps consumer liability for unauthorized charges on credit cards at $50, the loss to merchants and card issuers is far more significant and amounts to hundreds of millions of dollars per year. For face-to-face transactions, if the unauthorized use of a credit card occurs despite the merchant following all the rules established by the credit card associations, it is the issuer or acquiring bank that will be responsible for such a loss. For MOTO transactions, on the other hand, it is the merchant that will bear the brunt of the responsibility for fraudulent credit card charges. With the advent of the Internet and the incredible rate of increase in online credit card transactions for goods and services, the issue of credit card fraud has once again grasped the attention of the industry. Since an online credit card transaction is treated as a MOTO transaction, it is merchants that bear the brunt of the responsibility if any fraud should occur.

Over the past two decades, many different ideas, methodologies and hardware 5 have been advanced in the field of credit card transactions with the hope of providing a more secure credit card to the user. These efforts have, in large part, been especially concerned with protecting against stolen credit cards or their unauthorized use by a perpetrator who falsely assumes someone else's identity. While the prior art is replete with various and diverse secured or even smart credit card systems, credit card fraud is still a serious and widespread problem. This is because many attempts to provide a smart, secure credit card system in the past have proven to be too complex and user-unfriendly, and this is believed why such cards, with the exception of American Express' Smart or Blue Card (see below), have not gained user acceptance.

One conspicuous example among many can be found in U.S. Pat. No. 4,614,861 issued in 1986 to Parlov et al. In this patent, the inventors advanced the idea of a unitary, self-contained credit card which has the ability to verify a personal identification number (PIN) which is entered directly into the card by way of a keyboard without the use of an outside terminal. Furthermore, a transaction identification code (TIC), which varies for each transactional use of the credit card, is automatically generated for later transaction validity verification after a valid PIN is entered and accepted by the card. While the methodology advanced at the time was indeed novel in its capability of eliminating unauthorized or fraudulent use other than by the card owner, it suffered nonetheless from a number of major drawbacks. First and foremost is the complexity of the system itself. The instructions of how to use the credit card alone are a major burden to card owners in order to ready the card for even a simple routine transaction. In other words, the credit card system is extremely user-unfriendly. Second, the system requires the additional use of a peripheral device and also a card validation device in order to safeguard and facilitate the transaction algorithm for achieving the level of security for the system. Such a requirement of additional equipment further complicates the utility and elevates the already expensive components cost of the system. Third, the system is incompatible with existing credit card transaction infrastructure and merchants who opt to use such a system must invest in new and expensive equipment in order to reap the system benefits. Consequently, such a credit card system has not achieved a widespread level of acceptance and usage by the general public.

In U.S. Pat. No. 4,650,978 issued to Hudson et al. in 1987, a similarly complicated "bank" cash card system is advanced for handling fund transfer transactions between a payor and a payee having a magnetic "hysteresis" security arrangement. A cash card has a magnetic stripe on which the available cash balance, the identification and security information are scramble recorded. A transaction register machine reads data from the card, carries out the transaction and records the new account balance on the card. The modified information is "restored" on the card in the form of a re-scrambled code. The transaction register machine also includes a magnetic tape of the cassette type or disk for storing each transaction thereon for further processing of the information at a remote data processing center. The transaction register machine further includes a main keyboard on the side of the payee for displaying the cash balance, for entering the total amount of the sale and recording the new cash balance on the card. The main keyboard is responsive to the cardholder's keyboard which has a slot for insertion of the card for verification by entering the correct identification number known only to the card holder. Again, the complexity of such a system, together with its inherent incompatibility with the existing credit card transaction infrastructure, has proved to be too much of a barrier for the system to be widely accepted and implemented by the financial community.

In U.S. Pat. No. 4,868,376 issued to Lessin et al. in 1989, a general purpose, re-programmable intelligent card is advanced. The card includes an alphanumeric keyboard, an alphanumeric display and one or more input/output ports controlled by a microprocessor and programs stored in a memory associated with the microprocessor. The microprocessor is provided with an operating system and may be programmed or re-programmed for a specific application or for a variety of applications. While the card can serve multiple functions, it still suffers from several drawbacks that prevent it from being widely accepted by the general public, including its complexity in use, its innate incompatibility with existing credit card transaction infrastructure and the resultant high cost of operating such a system.

In U.S. Pat. No. 5,818,030 issued to Reyes in 1998, a secure, smart credit card having the same basic dimensions of a standard credit card is advanced. This invention provides a security system that uses the concept of a key, which, when removed, prevents unauthorized use of the card. The so-called dual device system has two parts. A first part is a micro programmable central unit (CPU) in the main body. The second part is an engageable intelligent micro memory module that functions as a key unit and is configured to join the main body to form an engaged unit having the general dimensions and appearance of a "smart credit-type card." The CPU of the main body and instructions are designed to operate in conjunction with the external intelligent micro memory module or key unit. The key unit stores the programs and date required by the processor CPU in the main body to allow the user to operate the credit card system. Although such a credit card system has the ability to help prevent unauthorized or fraudulent use, it is unlikely that this system will be widely accepted in the financial community because of its operational complexity from the user's standpoint, and its questionable compatibility with the prevalent credit card transaction infrastructure.

In U.S. Pat. No. 6,012,636 issued to Smith in 2000, a multiple application card data system is comprised of a data management device and a user card (a dual component system). This credit card system is, by design, rather complicated. A user can carry a single card that may be modified at will to, in effect, be a clone for any one of the user's provider data cards, through use of a companion data management device that can store data from a plurality of provider data cards. However, the system requires a user's interaction in order to transfer data from the data management device to the user card. In addition, the data management device also stores a digital data representation of the user's fingerprint for verifying the user's identity when compared with an actual scanning of the user's fingerprint image by the same device during the process of verification. Thus, the user's identification verification is by no means a simple procedure. Furthermore, the user card itself comprises two memories for storing data. The first memory stores data issued by a service provider and the second memory stores a set of data unique to the user. Before the user's scanned fingerprint image can be used for identification purposes, the data management device must first verify the data contents of the two memories resident on the user card. Without even raising the issue of the questionable public acceptance today with regards to using fingerprint imaging as a form of personal identity, the procedures the card user must endure in order to safeguard the card's security against unauthorized usage are far too complicated. It is believed that a much simpler card system can work just as well against unauthorized fraudulent use of credit cards without such burdensome overhead.

In U.S. Pat. No. 5,317,636 issued to Vizcaino in 1994, a method and apparatus for securing credit card transactions is advanced. This invention relates to the apparatus of authorizing credit card transactions and includes a system which is made up of an authorization computer and a credit card that work in conjunction to enhance the security of credit card transactions. More specifically, the system includes a smart credit card that includes a microprocessor processor, associated memories and a liquid crystal display. The credit card is used to produce a unique verification number by processing a transaction sequence number with an encryption algorithm. The verification number is then displayed in the display device, and can be transmitted to the authorization computer along with a customer identifying account number. The computer, which is used for authorizing the credit card transactions for the customers of the credit card issuer, uses the account number to access an account file for the credit card customer. That account file has general account data for the given customer, as well as a transaction sequence number, which corresponds to the transaction sequence number stored in the credit card. Additionally, the account file includes a de-encryption algorithm, which is complementary to the encryption algorithm of the credit card, such that the computer can use the de-encryption algorithm together with the verification number to produce a computed transaction sequence number.

The computed transaction sequence number is compared to the transaction sequence number stored in the computer to determine whether the two numbers correspond to one another. If they do, then the computer will authorize the transaction, if they do not, then the transaction will be rejected.

Both transaction sequence numbers, the one in the card and the one in the computer, are changed, preferably by increment, after the authorized transaction so that a different verification number is generated and used in the authorization of each different credit card transactions. Thus, the verification number used in one given transaction will not be useful in a subsequent transaction. Therefore, even if someone were to see the verification number used in one transaction, they would not be able to use it in a subsequent transaction.

This invention truly advances a viable methodology for preventing unauthorized usage for credit card transactions. However, such a methodology still has drawbacks. One drawback is that crucial information pertaining to the card holder and the encryption algorithm resident in the memory of the resident microprocessor on the card are not immune from discovery by modern day electronic piracy. Because the credit account number and the verification number generated for each transaction are both visibly made available to the merchant so they can be sent to a remote processing center for subsequent authorization, once the contents of a card is illegally obtained, there is no way to safeguard against subsequent large scale fraud. Another drawback is that transmittal of the encrypted verification number, which is an alphanumeric number comprising 14 or more characters, rather than a 4-decimal character PIN, along with the user identifying credit card number, might not be compatible with existing credit card transaction infrastructure. In the real world, this represents a major roadblock for whether or not such a system will be accepted by the financial community.

In U.S. Pat. No. 5,627,355 issued to Rahman et al. in 1997, security equipment protecting the relaying of account numbers and personal identification numbers (PIN) by telephonic or other communication link is advanced. The equipment includes a host computer and a remote portable transaction device that interact with one another. A credit granting institution generates an account number and a series of unique personal identification numbers for each account number. This information is stored in the host computer's memory and is assigned as a reference series to an individual customer account number. An identical series of numbers in the same sequence is stored in the memory of the remote device. In operation, the customer account on the host computer is activated and the host computer's memory is indexed sequentially to the first number in the reference series. During use of the remote device, a unique personal identification number is added to the customer account number and transmitted to the host computer. There it is compared to the account number and personal identification number in the reference series. The computer will authorize the transaction if the number in the stored series is identical to the number in the reference series; otherwise the transaction will be denied or questioned.

The method advanced in U.S. Pat. No. 5,627,355 for preventing theft of credit information, in particular the personal identification numbers (PIN), has a number of operational disadvantages. In this patent's teaching, the credit card number is always visible for use by anybody getting hold of the card. This number, along with a special PIN visibly generated on command on the card which varies sequentially in synchronism with the issuer from transaction to transaction, must be passed on to the credit granting institution for authorizing the transaction. Even though the PIN is unique for each transaction, there is nothing to stop anyone in possession of a stolen card from sequentially generating the right combination of the PIN and account number, even though it might take some time to successfully carry out an unauthorized transaction.

Furthermore, it is operationally questionable whether or not the method taught in U.S. Pat. No. 5,627,355 (Rahman et al.) is actually scaleable. Because the host computer has to store so many PIN numbers (literally hundreds for each customer alone that has multiple credit cards from different providers), access time and memory capacity of the host computer may become critical parameters in terms of whether the processing system will function smoothly as the number of card holders grows larger. The same worry also applies to occasional but unavoidable system glitches when such a huge quantity of numbers has to be reconciled.

In U.S. Pat. No. 5,955,961 issued to Wallerstein in 1999, a programmable transaction card is proposed. Such a programmable transaction card enables accessing a selected one of a plurality of different accounts with the same or different financial institutions through communication with an authorization center while providing important anti-fraud features. The transaction card includes a keyboard for selecting a desired account and for entering optional identification information for the card. The transaction card generates an account number corresponding to the selected account. The account number, together with the identification information, if entered, is presented in a form that is readable by a reader device but is not discernable by the human eye, e.g. by emulation of a magnetic strip or an optical pattern. After a reader device (magnetic or optical reader) reads the account number and the identification information during a transaction, the account number and the identification information are transmitted to the authorization center for verification and access to the selected account.

At first glance the programmable transaction card advanced in U.S. Pat. No. 5,955,961 (Wallerstein) has packed away too many features in it so as to render it rather cumbersome and complicated to use, expensive to implement and user-unfriendly. For example, when data presentation takes the form of a magnetic strip, a rather bulky inductor coil (electromagnet) must be deployed and form part of the card itself in order to generate the time-varying magnetic field needed for transmitting the encoded information to a conventional magnetic reader. Inclusion of such an inductor on the transaction card will certainly make it bulkier, and it is questionable whether it is actually compatible with most magnetic strip readers which read data via swiping the magnetic strip through a static reader head. Also, incorporation of the feature of being able to select from a plurality of different accounts necessitates the use of an awkward thumb-wheel switch on the card, which is less user-friendly. The same applies to the situation when tonal identifying controls are added to the card, which will certainly make the latter even more bulky. Furthermore, it is questionable whether credit card users would even know or appreciate how to use the tonal identification features of this transaction card.

Technically speaking, the use of a time-varying magnetic field to transfer information encoded on the transaction card to a conventional magnetic stripe reader is highly risky and certainly represents a big deviation from the normal magnetic data transfer interface. When all these extra but not necessarily useful features (at least for most ordinary credit card holders) are incorporated into this transaction card, such a card will be much more complicated and less friendly to use.

Starting out in Europe a few years back, a new kind of credit card was introduced, called the "SmartCard," with the hope of using new technologies to combat fraudulent online credit card transactions. Such a card actually includes a microchip and a card reader to connect to a user's personal computer (PC). With the use of the card reader, all transaction information, including personal information pertaining to the cardholder, are heavily encrypted with the most advanced security standard before such information is sent out over the Internet. However, such encryption requires special equipment provided to the cardholder. And, despite heavy promotional and advertisement expenditures, the SmartCard system has not yet been well received in the United States.

In summary, all of the above-noted advancements of credit card system ideas, methodologies and hardware are primarily directed to security aspects of credit cards, particularly against stolen cards or perpetrators illegally assuming somebody's identification after successfully intercepting the individual's personal and financial information on or off the Internet. However, nearly all of the systems proposed to date are either too complicated, tending toward overkill in some cases, or user-unfriendly, or too costly to implement or simply incompatible with existing credit card transaction infrastructure. Thus, there is a long-felt need for a simple, user-friendly, low-cost way to deter credit card fraud in an existing infrastructure-compatible credit card system.

In addition, there has been a failure to recognize, much less address, issues of privacy or anonymity associated with the use of credit cards in general. This has become an even greater concern as credit cards are being used to conduct transactions over the Internet. While consumers are protected from large financial losses that may occur through Internet credit card fraud, they are not protected from potential loss of consumer personal privacy while doing business on the Internet. To execute an online credit card purchase, a consumer has to supply a merchant with the consumer's name, address and a valid credit card number, in addition to the kind of merchandise or service that the consumer is buying. Although such a transaction may appear no different than executing a telephone order, it is far different because the consumer's personal information is up for grabs by anybody capable of intercepting such information as it is transmitted through the Internet. This is a very serious concern in view of the increasingly widespread and prevalent practices of data collection that are being used to profile buying habits of online consumers, especially as profiling extends to such information as buying habits, buying frequency, dollar value and merchandizing taste.

Accordingly, there is a long felt need for better methods of preventing credit card fraud that are not only user friendly, but that also protect the privacy of credit card users.

SUMMARY OF THE INVENTION

The present invention is generally directed to a method for implementing an anonymous credit card transaction between a user and a merchant. The transaction can be implemented face to face or by way of a Mail Order Telephone Order ("MOTO"), the latter category including any transactions not carried out face to face, such as transactions carried out over a computer network. Before the actual transaction can take place, a user must establish a user account with a credit source. The user account is associated with a fictitious name, a user account number and a user settlement mechanism through which the user can pay the credit source for charges and fees billed to the user account. The user is provided with an electronic card that includes a card base, a storage medium that can be read by a card reader but is not readable by a human eye, a computer, an input mechanism and a power source. The computer in the electronic card executes an algorithm that uses a user key and a card number as input variables to generate a valid personal charge number. The user key is input into the card through the input mechanism, the card number is stored in the card and the fictitious name is stored in the storage medium. The valid personal charge number is sent with a monetary charge value and the fictitious name to a credit approval center for approval. After the credit approval center has approved the transaction, the user is billed for the transaction through the user settlement mechanism.

In a first, separate aspect of the present invention, when the credit card transaction is a face to face transaction, a card reader is used to read the valid personal charge number and the fictitious name account. In addition, the user may be required to provide the merchant with the fictitious account name that must be verified by the merchant to complete a valid transaction.

In another, separate aspect of the present invention, when the credit card transaction is a MOTO transaction, the valid personal charge number is visually read from a display controlled by the computer on the electronic card.

In still other, separate aspects of the present invention, the valid personal charge number can be generated from the card number by inserting the user key into the card number through use of a user insertion key associated with the user account and a permutation variable. The permutation variable can be changed from an initial state to a different state to change the valid personal charge number between successive transactions. The user insertion key can be derived from the fictitious account name.

In still further, separate aspects of the present invention, the card number contains at least four less numbers than the valid personal charge number, the valid personal charge number contains at least one non-numeric character and the electronic card does not permanently visually identify the user name, the fictitious account name or the card number of the user account number.

Accordingly, it is a primary object of the present invention to provide a method for implementing anonymous credit card transactions between a user and a merchant through the use of an electronic card.

This and further objects and advantages will be apparent to those skilled in the art in connection with the drawings and the detailed description of the preferred embodiment set forth below.

DETAILED DESCRIPTION OF THE PREFERRED EMBODIMENTS

Figure 1:
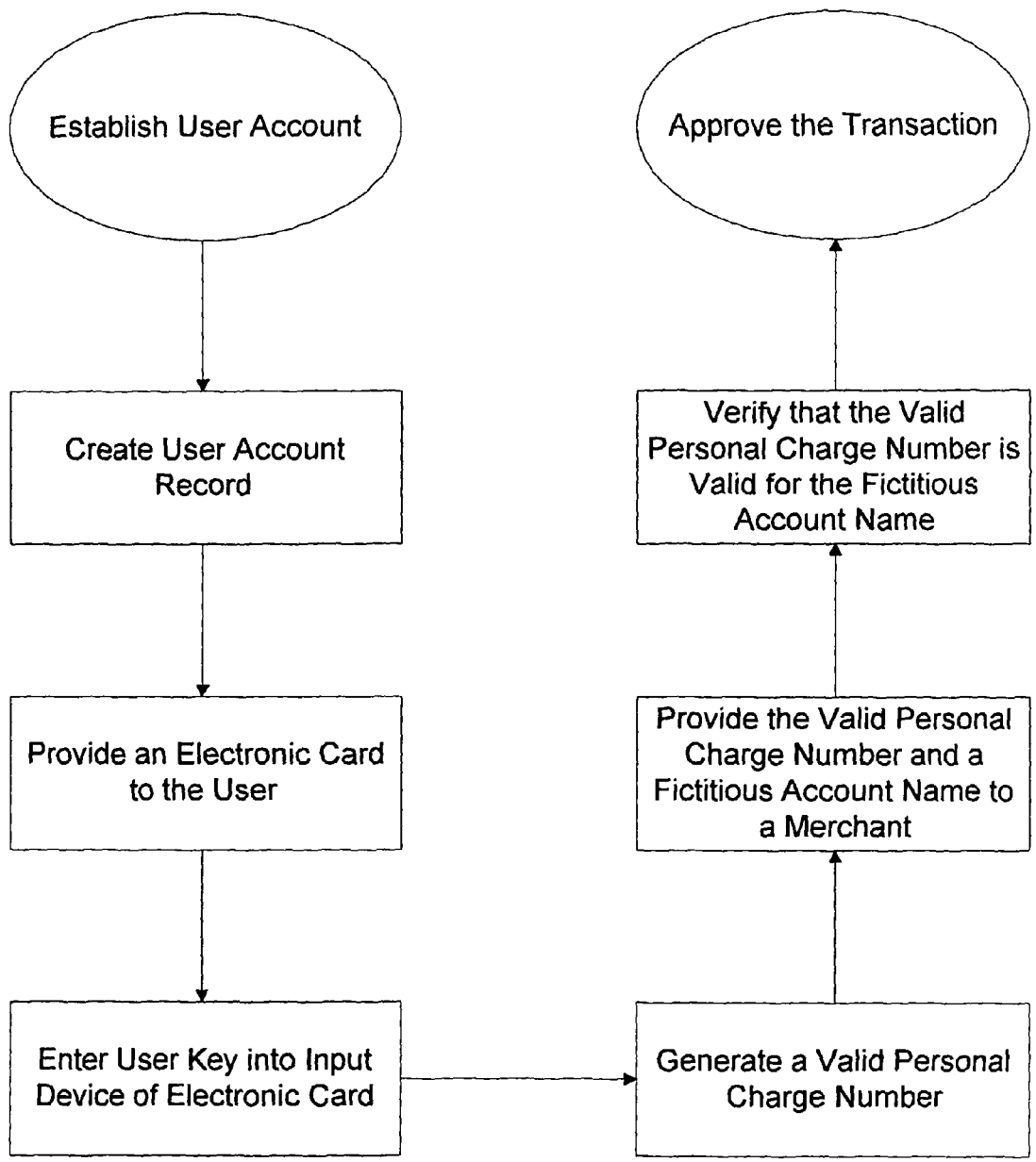
FIG. 1 is a simplified, schematic diagram of the preferred embodiment of the present invention.

The present invention is related to U.S. Pat. Nos. 5,913,203, 5,937,394 and 5,956,699, the disclosures of which are all specifically incorporated herein by reference.

A preferred embodiment of the present invention is depicted in FIG. 1. In accordance with this preferred embodiment, a user must first establish a user account with a credit source. The credit source may be a bank, a credit card company or any other institution involved with issuance of credit cards or bank debit cards, such as a credit union or other institution, or a money source as described in U.S. Pat. No. 5,913,203. When the user establishes a user account with the credit source, one or more user settlement mechanisms through which the user can pay the credit source for charges and fees billed to the user account will be established. For example, in the case of credit card transactions, the user and the credit source will enter into an agreement concerning use of the credit card. As a further example, in the case of debit or electronic checking services, the user and credit source may enter into a separate agreement concerning how and from what account such debits will be debited.

After a user account is established, the credit source will create one or more user account records associated with the user account to contain a variety of information, including a user account number, a fictitious account name, a "Proxy Agent," a user key and, when applicable, a user insertion key. The fictitious account name can be selected by the cardholder or the issuer of the credit card, but it has to be known by both. The "Proxy Agent" is used to conceal the cardholder's actual address and still comply with current credit card transaction regulations—in other words, it is a fictitious address. Additional information that might typically be contained within such records includes cross references to other accounts, the user's name and the user's billing address.

The preferred embodiments of the present invention utilize an electronic card. A preferred embodiment of such a card is described in the co-pending patent application identified in Cross-Reference to Related Applications set forth earlier. Although the details of such a card are set forth in greater detail in the co-pending patent application, a summary of the electronic card will be included herein for ease of reference. The electronic card is a unitary, self-contained electronic device having physical planar dimensions that are essentially identical to those of a conventional magnetic stripe credit card, which is widely used in electronic commerce today. The device can included six components.

The first component is the card base. The other components, in one way or another, are affixed to this base.

The second component is a computer, such as a single integrated chip or a microprocessor with access to save memory The third component is a display controlled by the computer, such as a liquid crystal display.

The fourth component is an input mechanism, such a keypad.

The fifth component is a magnetic storage medium, such as a magnetic stripe.

The sixth is a power source, such as a battery or a solar cell.

In order to reduce the cost of use of the electronic card, and increase the range of applications in which it can be used, the electronic card should have a magnetic storage medium that can be read by a standard magnetic stripe reader. This means that the magnetic storage medium must be capable of being read by a standard magnetic stripe reader. It also means that the portion of the electronic card containing the magnetic storage medium must be sized such that the magnetic storage medium will work with standard magnetic stripe readers. A standard magnetic stripe reader works by passing the magnetic stripe portion of a card, such as a credit card, through the magnetic stripe reader in a swiping motion. Standard magnetic stripe readers have been prevalent in retail stores throughout the United States for many years.

It is especially preferred that a card number and an algorithm for generating a valid personal charge number are stored in the computer. It is also especially preferred, for purposes of simplicity, that the card number be the same as the users account number although this need not be the case.

For purposes of clarification and illustration, an example of an application that uses the methodology taught in U.S. Pat. No. 5,956,699 is presented here. Assume that the card number (CN) stored in the electronic card and the PIN number are, respectively:

CN=4678 0123 4567 8012 1200
PIN=2468

Next, assume that the application uses an algorithm that first deletes four (4) digits from the CN and then inserts in their place the PIN according to the insertion sequence indicated by a so-called PIN Sequence Insertion Number (PSIN) in order to come up with a scrambled Anonymous Credit Card Number (ACCN), also containing 20 digits. The 4-digit PSIN number can either be chosen by the cardholder or assigned by the issuer. Let us assume for this example that the cardholder's PSIN is 1357.

Next, assume that the algorithm only operates on digits 7 through 16 of the CN. This takes into account the fact that the first 4 digits of the standard CN denote the identification of the credit card issuer and the last 4 digits of the standard CN are reserved for the expiration date, all of which should be left undisturbed. Thus, it is the middle 11 digits that indicate the account number for the cardholder of the CN. Therefore, the algorithm calls for the cardholder to first delete the last four digits of the 10-digit account number. In this example the 4 digits to be deleted will be "8012". The 6-digit number before the cardholder PIN is inserted according to the cardholder's PSIN is "23 4567".

Now the algorithm defines the numbering convention of the digit positions in the ACCN. The first digit position is defined as the zeroth ($0^{th}$) and the second is the first ($1^{st}$) etc. Thus, according to the PISN 1357, the PIN 2468 should be inserted to form the ACCN as follows:

ACCN=467801 22344658 67 1200

The 4 digits of the PIN=2468 occupy, respectively, the $1^{st}$, $3^{rd}$, $5^{th}$ and $7^{th}$ positions (according to PISN=1357) using the defined digit position numbering convention. In a simpler algorithm for inserting the PIN, the PIN number itself can act effectively as the PSIN so that the cardholder does not have to remember two numbers. Using such an algorithm, in the example above, the ACCN will now be:

ACCN=467801 2324456687 1200

The 4 digits of the PIN=2468 also occupy, respectively, the $2^{nd}$, $4^{th}$, $6^{th}$ and $8^{th}$ positions of the ACCN (according to an implicit PSIN=PIN=2468) using the defined digit position numbering convention.

The foregoing is an example of a very simple algorithm to generate a valid personal charge number. As would be apparent to a person of ordinary skill in the art of computer programming, especially with the benefit of this disclosure, much more complicated algorithms could be devised and used which would use the card number and the user key to generate a valid personal charge number.

When the electronic card is used in a retail transaction, by merely entering one's own PIN into the electronic card prior to giving it to the merchant for swiping the credit card transaction, one takes full advantage of the secure and anonymous transaction afforded by the electronic card. The user can first check his or her alias and entered PIN (note that the PIN is never stored in the electronic card) using the keypad on the electronic card before the electronic card is handed it over to the merchant. Since the cardholder has in effect already signed the transaction with a digital signature (his or her PIN), no additional hand signature is required to complete the transaction. The merchant only need receive the PIN-modified anonymous credit card number (ACCN) and the user's alias. The ACCN and the alias are read by a conventional magnetic stripe reader and are processed in exactly the same fashion as a conventional credit card number and credit cardholder name since such information can be sent to a credit card approval agent for approval of the transaction. The credit card approval agent has all of the information necessary to determine if the transaction is valid or fraudulent. The identity of the entity who authorized the credit card, as well as it expiration date, is available in the ACCN in just the same manner as it is available in a conventional credit card transaction. The card number is verified by confirming the card number contained in the ACCN as valid for the alias.

To use the electronic card for Internet transactions, a cardholder first enters the PIN into the electronic card exactly like that for off the Internet transactions. Next, the cardholder continues the transaction using only the cardholder's alias, the ACCN appearing in the LCD display and also the cardholder's choice of trusted delivery or Proxy Agent (optional) should the cardholder prefer to make this transaction completely anonymous. Thus, by carrying just one electronic card which looks and feels exactly like a regular magnetic stripe credit card, one is now able to make old world credit card transactions like one always has done in the past. But, more importantly, one can now use the same electronic card for making secure and anonymous transactions, anywhere in the world, and for both on and off the Internet transactions.

As is apparent from the foregoing description, the real name and address of the cardholder, including the credit card number itself, never need appear on the Internet or even need to be made known to the merchant. Even though the ACCN or Coupon (Customer One-time Unique Purchase Order Number) does appear, together with the alias of the cardholder, across the Internet during the online transaction, this ACCN or Coupon number does not stay the same, according to the methodology of U.S. Pat. No. 5,956,699, but changes automatically after every transaction or use. Thus, unlike all the other credit card transactions on the Internet today, no valid credit card numbers are actually available in transmission for theft by anybody. Only the ACCN or Coupon number will appear on any or all transaction records and that number is useless for any subsequent transactions because it is time variant.

Although the foregoing detailed description is illustrative of preferred embodiments of the present invention, it is to be understood that additional embodiments thereof will be obvious to those skilled in the art. For example, while it is presently the case that track 2 of the magnetic stripe only contains numeric characters in view of the conventions in current use, it is contemplated that a valid personal charge number could contain at least one non-numeric character if such conventions are changed for use in new conventions.

Accordingly, it will be readily apparent to those skilled in the art that still further changes and modifications in the actual concepts described herein can readily be made without departing from the spirit and scope of the disclosed inventions as defined by the following claims.

What is claimed is:

1. A method for implementing an anonymous Mail Order Telephone Order ("MOTO") credit card transaction between a user and a merchant, comprising the steps of:
    establishing a user account between a credit source and the user which Is associated with a fictitious account name, a user account number, a user key and a user settlement mechanism through which the user can pay the credit source for charges and fees billed to the user account;
    providing the user with an electronic card that is comprised of:
        a card base;
        a storage medium affixed to the card that can be read by a card reader but is not readable by a human eye;
        a computer affixed to the card;
        an input mechanism for providing input to the computer;
        a display controlled by the computer; and
        a power source for supplying power to the computer;
    wherein the electronic card has the fictitious account name stored in a memory device accessible by the computer, the computer is capable of causing data to be stored in the storage medium and the electronic card is sized such that a standard magnetic stripe reader can read the magnetic storage medium;
    completing a MOTO credit card transaction between the user and the merchant in which the user is charged a monetary value by the merchant, comprising the following steps:
        entering the user key into the input mechanism;
        executing an algorithm by the computer that uses the user key and a card number stored in the electronic card as input variables to generate a valid personal charge number;
        visually reading the valid personal charge number from the display;
        providing the valid personal charge number and the fictitious account name to the merchant;
        sending the monetary value, the valid personal charge number and the fictitious account name to a credit approval center that verifies that the valid personal charge number is valid for the fictitious account name and approves the MOTO credit card transaction; and
        sending an approval of the transaction from the credit approval center to the merchant.

2. A method as recited in claim 1, comprising the further step of:
    billing the user for the transaction through the user settlement mechanism.

3. A method as recited in claim 1, wherein the MOTO credit card transaction is conducted between the user and the merchant over a computer network.

4. A method as recited in claim 1, comprising the further steps of:
    establishing a user insertion key that is associated with the user account; and
    generating the valid personal charge number from the card number by inserting the user key into the card number through use of the user insertion key and a permutation variable.

5. A method as recited in claim 4, comprising the further steps of:
    changing the permutation variable from an initial state to a different state; and
    generating a second valid personal charge number from the card number by inserting the user key into the card number through use of the user insertion key and the permutation variable in the different state.

6. A method as recited in claim 4, wherein the user insertion key is derived from the fictitious account name.

7. A method as recited in claim 4, comprising the further steps of
    changing the permutation variable from an initial state to a different state; and
    generating a second valid personal charge number from the card number by inserting the user key into the card number through use of the user insertion key and the permutation variable in the different state.

8. A method as recited in claim 1, wherein the card number. contains at least four less numbers than the valid personal charge number.

9. A method as recited in claim 1, wherein the valid personal charge number contains at least one non-numeric character.

10. A method as recited in claim 1, wherein the electronic card does not permanently visually identify the user name, the card number, the fictitious account name or the user account number.

* * * * *